United States Patent [19]

Coller et al.

[11] Patent Number: 4,875,271

[45] Date of Patent: Oct. 24, 1989

[54] METHOD FOR PRODUCING THERMOPLASTIC FRAMES FOR FENESTRATION

[75] Inventors: John H. Coller, Whittier; Donald N. Littleton, Riverside, both of Calif.

[73] Assignee: D. G. Shelter Products Co., City of Industry, Calif.

[21] Appl. No.: 225,057

[22] Filed: Jul. 27, 1988

[51] Int. Cl.⁴ .......................... B23P 11/00; B23P 19/04
[52] U.S. Cl. ..................................... 29/432; 29/525.1; 49/505; 52/656
[58] Field of Search ...................... 29/429, 432, 525.1, 29/798; 49/501, 505; 52/656, 657; 222/93, 95; 264/152, 154, DIG. 65

[56] References Cited

U.S. PATENT DOCUMENTS

| | | | |
|---|---|---|---|
| Re. 31,536 | 3/1984 | Holdiman et al. | 49/501 |
| 1,511,746 | 10/1924 | Noll | 29/525.1 X |
| 2,046,251 | 6/1936 | Daniels | 49/501 |
| 2,955,291 | 10/1960 | Hansen | 29/432 |
| 3,845,604 | 11/1974 | Ottosson | 52/656 X |
| 4,250,680 | 2/1981 | Bomar | 52/656 |
| 4,813,182 | 3/1989 | Daniels et al. | 49/501 |

Primary Examiner—Howard N. Goldberg
Assistant Examiner—Andrew E. Rawlins
Attorney, Agent, or Firm—Poms, Smith, Lande & Rose

[57] ABSTRACT

A method and apparatus for producing thermoplastic frames for fenestration in which extruded frame members are cut to length, heated to a selected temperature uniformly throughout their cross section to soften the material and while heated, profiling selected portions of the cut members, driving a fastening clip with a hole therein into one of the cut members, and drilling holes in portions of the cut members in locations for coaxial alignment in assembly of the cut members, a hole in the fastening means plate coaxial with one of the drilled holes, and placing the members in selected angular assembled relation and inserting and threading a securement member into the aligned holes of the cut members and the fastening plate for retaining the frame members in assembled angular relation. An apparatus which includes an oven through which a conveyor transports cut members in diagonal relation for uniform heating of the members, a profiling station for shaping surfaces of the cut member, a driving station for embedding a fastener plate in a cut member; and a drilling station for making holes in selected portions of the cut members for assembly of the cut members in angular relation and with a screw member passing through said holes and a hole in said fastening plate for providing a rigid unyielding corner joint of such cut members.

8 Claims, 7 Drawing Sheets

METHOD FOR PRODUCING THERMOPLASTIC FRAMES FOR FENESTRATION

BACKGROUND OF INVENTION

Fenestration products include windows, doors, and various types of polygonal and rectangular framing in general. In the manufacture of fenestration products, wood and metal materials have been used, such materials being relatively rigid, hard and dense. The fabrication of corner joints made of two angularly disposed rails was not difficult and securement means therefor to provide a non-yielding relation between two angularly disposed rails was readily made because the fastening elements, such as nails, screws, etc., could be tightly secured and fixed to the material of the rails without loosening after being subjected to loads.

Present construction methods have sought lightweight heat insulator-type materials for use in fenestration in order to provide readily handled materials and to provide continuity of insulation characteristics throughout a building structure which may include insulated walls, insulating type double pane windows and material having insulating characteristics used for window and door frames. Such lightweight type materials include thermoplastic materials such as a high density cellular polyvinyl chloride which may be rapidly extruded in selected cross-sectional shapes for a selected design of a window or door. However, such thermoplastic materials are relatively soft and the degree of purchase of fastening elements such as screws and nails in such material was inadequate. Such fastening elements when tightened and subjected to loads became loose and further tightening of the fastening elements sometimes resulted in eroding of the thermoplastic material forming the hole receiving the fastening element. Sustained purchase in such soft materials of screws was not satisfactory for desired construction standards.

Prior proposed methods and constructions for joining two members at a right angle corner, for example, have including inserting an anchor plate transverse to the axis of one member and passing a securement nail or screw through the other member and into and through the anchor plate in a wood construction. See Hansen, U.S. Pat. No. 2,955,291. Another prior proposed corner joint for frame structures included the use of a threaded insert in one member and a threaded bolt for engagement therewith passing through the other member and into the first member to provide a rigid fixed corner joint. See Ottosson, U.S. Pat. No. 3,845,604. In the latter patent, the frame material was wood or extruded aluminum section. In the first mentioned patent, the material of the frame members included fiberboard, a relatively soft material which does not provide sustained purchase for fastening elements.

In U.S. Pat. No. 4,203,189, the problem of fastening a thermoplastic heel to a shoe was facilitated by heating a metal fastener to a temperature above the softening temperature of the plastic material and then driving the fastening element into the thermoplastic material of the heel.

In such prior proposed constructions, the concept of this invention of producing thermoplastic frame members for fenestration uses and providing a production method and system for preparation of stock material to the step of rapidly interconnecting angularly disposed elements of said frames was not suggested.

SUMMARY OF INVENTION

The present invention contemplates a novel method and apparatuses for producing fenestration frames made of a lightweight cellular thermoplastic material in such a manner that corner joints and other joinders made from such frame members are rigid, non-yielding and will withstand various loads and stresses placed thereon in normal use. The present invention contemplates a method utilizing thermoplastic materials in which the thermoplastic material is extruded into a longitudinally extending frame member of selected cross-sectional shape and then cut to a pre-selected length. The cut frame members are subjected to heating and pass through a controlled heating zone by a novel conveyor means. The heating zone is controlled to that each of the cut members will be uniformly heated throughout its cross-sectional shape so that upon discharge from the heating zone and while at a preselected temperature, the material may be subjected to certain selected profiling to facilitate a corner connection, holes at selected locations are drilled therein, and a fastening plate is driven into the relatively soft non-resistant material to a selected position where a hole in the fastener plate is in alignment with the of the drilled holes. The fastener plate is selectively configured so that during assembly of the joint the fastener plate will not turn relative to the frame member in which it is embedded. A fastening screw is inserted in one of the drilled holes aligned with the other drilled hole and with the fastener plate and the fastener screw threadedly engages the hole in the fastener plate. The invention contemplates that the passage of the cut frame members through a heating zone be facilitated by a novel construction of a conveyor means and a particular arrangement of heating elements within the heating zone to provide heating of each cut member uniformly throughout its thickness.

It is therefore a main object of this invention to provide and disclose a novel method for the production of fenestration frames made of a lightweight thermoplastic material.

An object of this invention is to disclose a novel method of fabricating a corner joint from relatively soft thermoplastic materials.

An object of the present invention is to provide a novel means for heating pre-cut members of thermoplastic material uniformly throughout their thickness so that profiling of said members may be readily accomplished.

A specific object of the invention is to provide a novel conveyor construction for transporting the cut frame members through a heating zone in diagonal relation to the path of travel of the conveyor.

Another specific object of the invention is to provide a novel conveyor construction in which the cut frame members are readily arranged diagonally to the path of travel of the conveyor and the chain means on said conveyor includes upstanding studs or pins longitudinally offset from each other to facilitate the diagonal arrangement of cut members.

Another object of the present invention is to disclose a fastening plate adapted to be readily driven under pressure into the heated soft material of a cut member and to resist relative movement of the fastener plate when subjected to turning stresses of a fastening screw element.

A further object of the present invention is to disclose a novel joint construction embodying frame members of thermoplastic material in which the frame members may be assembled into tight, non-yielding, fixed relationship and is capable of withstanding load stresses of normal operation.

The invention also contemplates a novel profiling station having dies or knives which readily slice through the heated material to form a profile adapted to mate with an adjacent member of selected shape.

Various other objects and advantages of the present invention will be readily apparent from the following description of the drawings in which exemplary embodiments of the invention are shown.

DETAILED DESCRIPTION OF THE INVENTION

Figure 1:
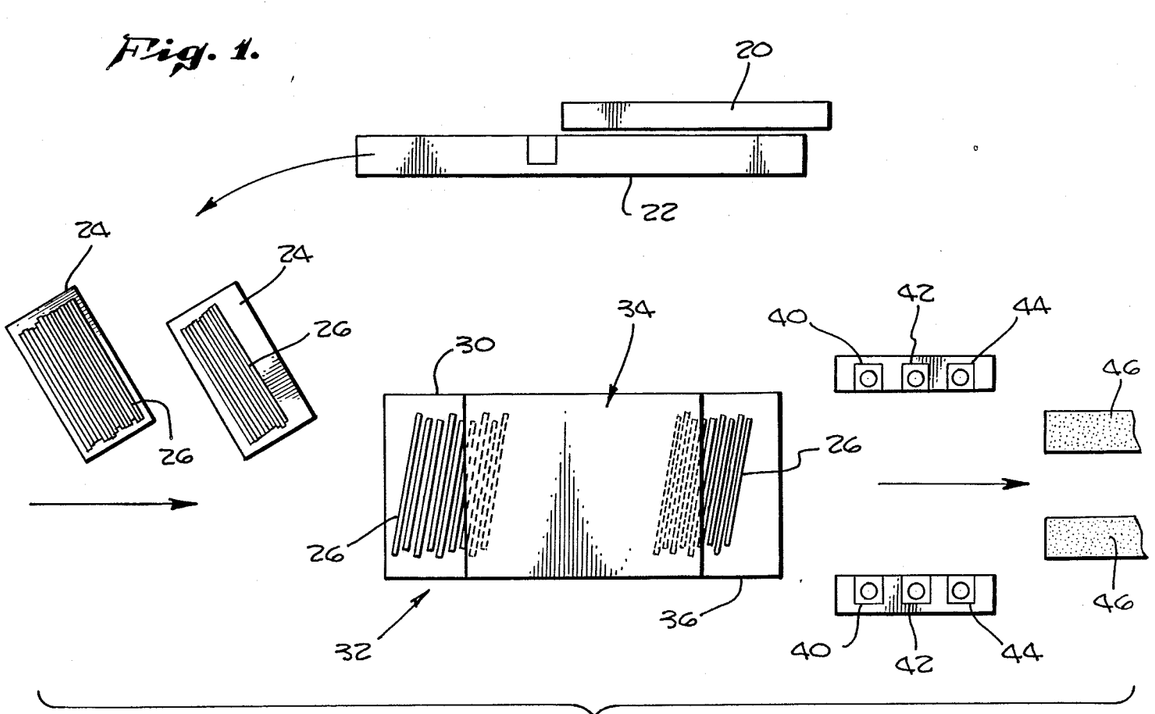
FIG. 1 is a schematic layout of a system for preparing a thermoplastic material for production of frames for use in fenestration.
Figure 2:
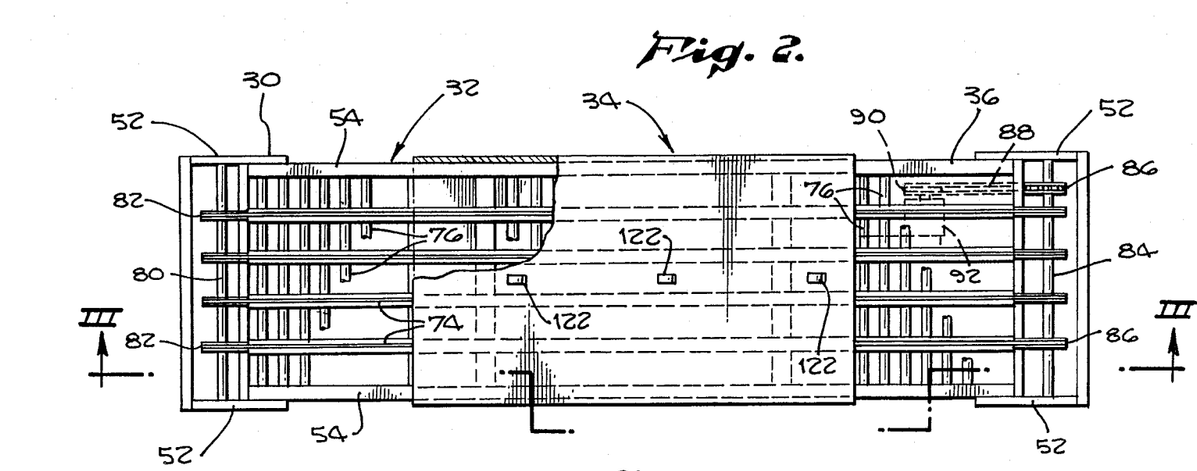
FIG. 2 is a top plan view partly in section of a conveyor means and oven to provide a heating zone for pre-cut frame members.
Figure 3:
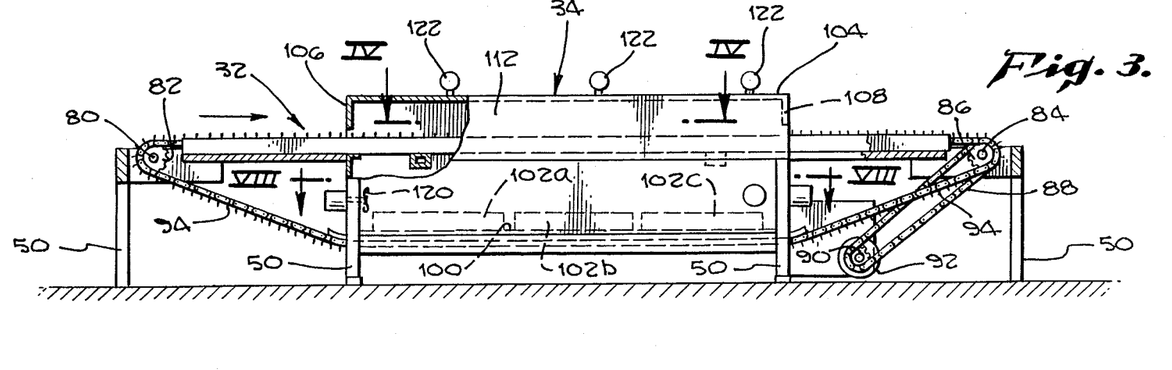
FIG. 3 is a vertical longitudinal sectional view taken in the planes indicated by line III—III of FIG. 2.

In FIG. 1, there is shown a schematic diagram of a method or system of producing fenestration frames embodying the present invention. It will be understood that the stock material used for production of the fenestration frames embodying this invention may be a thermoplastic material such as a high density cellular polyvinyl chloride material which provides a product that is more energy efficient than wood. The stock pieces may be finished in different manners such as, an exteriorly exposed stock piece may be clad in a white or bronze aluminum, whereas an interior stock piece would be pre-finished lightweight in light or dark oak, stain or acceptable paint. By the term "energy efficient", applicant refers to the insulating or heat transfer characteristics of the cellular polyvinyl chloride extruded material. A virtually maintenance free characteristic is provided by the aluminum cladding of the surfaces of the stock pieces for exterior use. A suitable finish such as veneer, stain or paint may be provided for the interior surfaces of the stock pieces. A product using such material is sold under the trademark Clearwood owned by D. G. Mouldings of Marion, Va.

Referring to the drawings, the schematic layout shown in FIG. 1 illustrates a table 20 on which stock pieces may be assembled for feeding to a saw table 22. The stock pieces assembled on the saw feed table 20 are derived from extrusion apparatus or from some pre-supply table carrying lengths of the extruded material.

After the saw on table 22 has cut stock pieces to selected length, they may be carried on stock carts 24, the stock pieces being indicated at 26 and may vary in length as generally indicated. From the stock carts 24, the pieces are transferred to an inlet end 30 of a conveyor means generally indicated at 32 which passes through an oven or heating zone 34, the conveyor 32 having an outlet or discharge end 36. The conveyor is so arranged as described later to transport and advance cut stock pieces 26 in diagonal relation to the path of travel of the conveyor. The cut stock pieces pass through the oven in spaced relation. Within oven 34, the pieces are transported at a selected rate of speed and under controlled temperature conditions so that the material of each stock piece 26 is heated to a temperature of between 150° and 160° F. uniformly throughout its thickness.

When the heated stock pieces 26 are discharged from the outlet 36 of conveyor 32, they are immediately transferred to a profiling station generally indicated at 40 where end portions of the cut stock pieces are sliced to remove a selected amount of material profiled to facilitate the making of a joint between two mating stock pieces, as described later. Immediately after the profile slice has been made, the cut stock piece is transferred to a clip or fastener inserting station 42 which drives a fastening element into the stock material at a selected controlled position. The fastener element will be described in detail later and serves as an anchor plate for holding two angularly related mating cut stock pieces in assembly. The work on the material of the cut stock pieces at the profile station 40 and the clip driving station 42 occurs very rapidly and the material of the stock piece is essentially at the temperature of between 150° to 160°. After the clip inserting station, a drill station 44 is provided in which holes are selectively driven into the stock pieces by accurately located jig means so that assembly of mating stock pieces may be readily accomplished and secured by a lag bolt or other suitable securing means. After the drilling station 44, the stock pieces which have been profiled, the fastener clip installed therein and holes drilled therein, may be transferred to suitable conveyors 46 for transport to a storage of bin stock parts which are located adjacent glazing tables or other tables for continuing the assembly function of a fenestration product.

The above brief description of the schematic system shown in FIG. 1 illustrates the general processing of the material and operations performed thereon to provide stock pieces which may be readily assembled into fenestration frames and glazing for the insertion of double pane glass in the frames may be readily accomplished.

Figure 8:
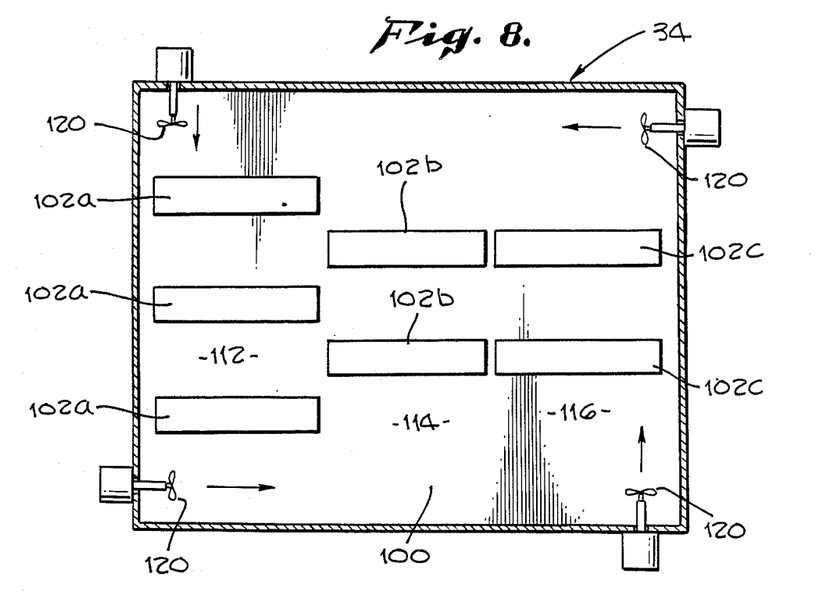
FIG. 8 is a plan view taken in the plane indicated by line VIII-VIII of FIG. 3 of the oven or heating zone portion of the conveyor means.

Reference is now made to FIGS. 2–7 inclusive which illustrate the novel conveyor means and the oven or heating zone shown in FIG. 8.

Figures 4, 5, 6, 7:
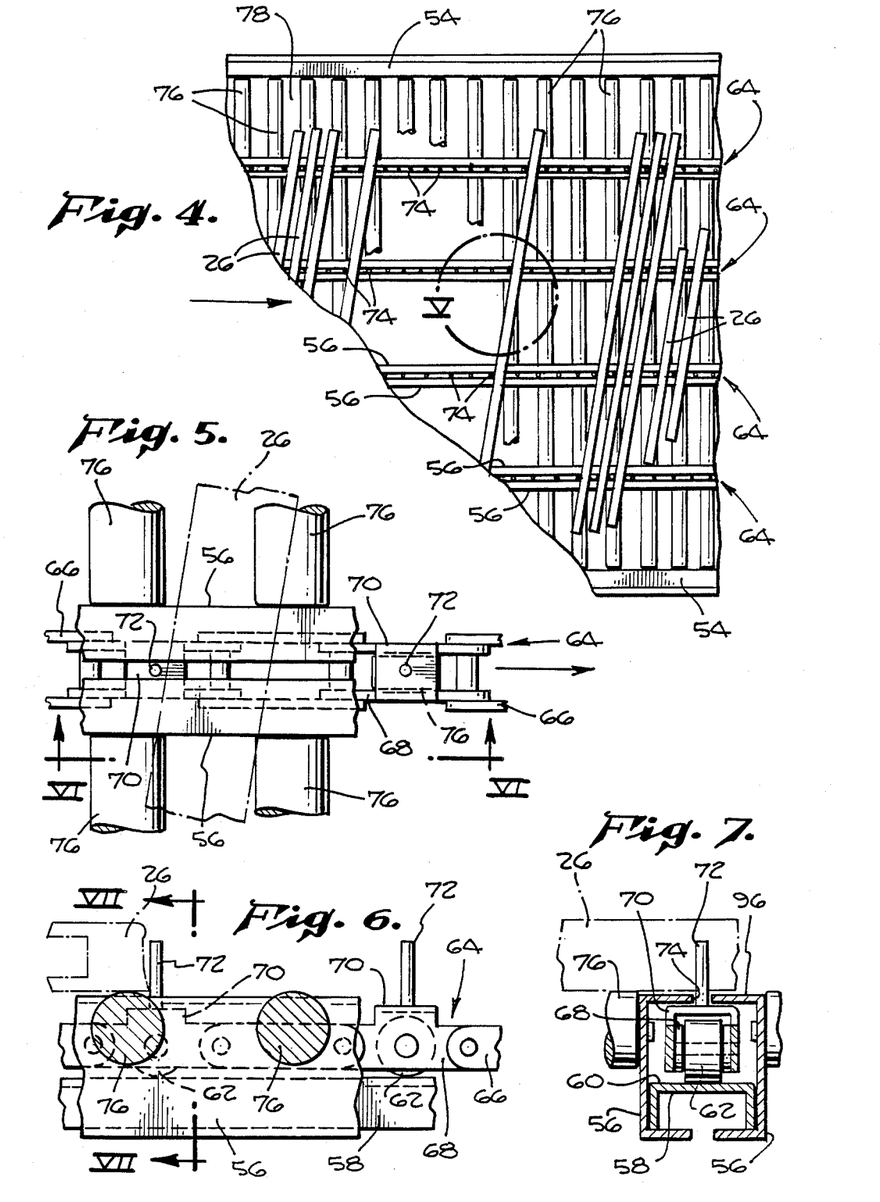
FIG. 4 is an enlarged fragmentary sectional view taken in a horizontal longitudinally extending plane as indicated by lines IV—IV of FIG. 3.
FIG. 5 is an enlarged fragmentary portion of the conveyor means indicated by the circle 5 shown in FIG. 4.
FIG. 6 is a fragmentary view taken in the plane indicated by line VI—VI of FIG. 5.
FIG. 7 is an enlarged fragmentary sectional view taken in the plane indicated by line VII—VII of FIG. 6.

The conveyor 32 may comprise a base frame including end and intermediate frame members 50 which support end side frame members 52 which are interconnected by channel members 54 extending between the end side frame members 52. Between the side channel members 54 are supported a plurality of intermediate chain enclosing oppositely facing pairs of channel members 56 as best shown in FIG. 7. Each pair of channel members 56 support a longitudinally extending downwardly facing channel member 58 which extends for the length of the conveyor and which provides a supporting surface 60 for rollers 62 of a chain means generally indicated at 64.

As best shown in FIGS. 5 and 6, chain means 64 comprises a plurality of pivotally interconnected widely spaced links 66 joined by pivotally interconnected narrowly spaced sets of links 68. Between each of the links 68 is pivotally mounted a roller 62. Also supported by each set of narrowly spaced links 68 is a saddle 70 which is pivotally mounted about the axis of roller 62 and which carries an upstanding pin or stud 72 which extends through the longitudinally extending slot 74 formed by the oppositely disposed channel members 56. Slot 74 provides a longitudinally extending guideway for the upstanding pins 72 throughout the length of conveyor 32.

The plurality of oppositely disposed sets of channel members 56 provide a plurality of longitudinally extending parallel spaces in which are mounted transverse conveyor rollers 76. Conveyor rollers 76 are pivotally mounted in the adjacent channel members at a selected spaced relationship to provide sufficient openings 78 for free flow of heated air through the conveyor means. In the example shown, the rollers 76 provide five roller pathways along the length of the conveyor means, the pathways being defined by the side frame members 54 and also by the sets of channel members 56 between which are moved a plurality of chain means 64. As shown in FIG. 4, the pins 72 of one chain means 64 is longitudinally offset from the pins 74 of an adjacent chain means so that the positioning of the stock pieces 26 in diagonal relationship with respect to the direction of travel of the chain means may be readily facilitated.

Each of the chain means 64 may be supported at the inlet end of the conveyor by a common transverse shaft 80 having spaced sprockets 82 thereon for engaging respective chains 64. At the outlet end of the conveyor means, a common shaft 84 may likewise support sprockets 86 for driving each of the chain means 64. The common shaft 84 at the outlet end of the conveyor means may be connected to a drive chain 88 driven through a suitable drive sprocket 90 from a motor means 92. The motor means 92 is preferably a variable speed drive motor so that a selected rate of travel or movement of chain means 64 may be readily varied.

The chain means 64 after passing around sprocket 84 is passed downwardly beneath the conveyor and forms a bottom lay 94 which passes underneath the oven and heating zone 34.

The stock pieces 26, FIG. 7, are supported by rollers 76 a slight distance above the top surface 96 of channel members 56 so that transport of the stock pieces 26 may be facilitated and the bottom surfaces thereof will not be engaged, scratched or marred by the stationary top surfaces of channel members 56. Further, although the stock pieces 26 may be of different cross sectional configuration, their surfaces in engagement with freely rotatable idle rollers 76 will permit virtually anti-friction advancement of the stock pieces along the conveyor means.

As indicated above, the stock pieces 26 are transported through the oven 34 by contact with the upstanding pins 72 with the stock pieces in diagonal relation to the rollers 76. The oven means 34 may comprise an enclosed metal sided box-like construction which includes a bottom wall 100 arranged to support a plurality of heater units 102. The arrangement of heater units 102 is best shown in FIG. 8 where at the entrance end of oven 34, heater units 102A include a bank of three spaced heater units arranged transversely of the path of travel. Two banks of two transverse heater units 102B and 102C are spaced longitudinally, units 102C being adjacent the outlet end of the conveyor. The heater units 102 transmit heat upwardly through the openings 78 between rollers 76 and between the longitudinally extending channels 56. At the top of oven 34 is provided a cover 104 which serves to contain the heat above the upper lay of the conveyor means 32. The cover 104 is provided with depending end walls 106, 108 which terminate in spaced relation to the top of pins 72 a sufficient distance to permit the thickness of the stock pieces 26 to pass thereunder as the stock pieces enter and leave the heating zone. The three heating units 102A in the entry zone 112 as shown in FIG. 8 provide a higher temperature in the first and entry zone 112 for the relatively cold entering stock pieces. As the stock pieces progress into a middle or intermediate heating zone 114, the heater units 102B may provide a somewhat lower temperature zone. As the material progresses into the last heating zone 116 before discharge from the oven, the heater units 102C may be operated at a still lower temperature and one which will provide a desired final temperature in the stock pieces 26. The selected lower temperatures provided by units 102B and 102C establish a heat dwell which results in uniform temperature throughout the thickness of the stock pieces 26 and which reduces the chance of scorching or burning the exterior surfaces of the pieces 26.

To provide circulation of heat from the heating units 102, a plurality of fans are provided in the oven in order to circulate the air within the oven in a circular pattern. In FIG. 8, fans 120 are exemplarily illustrated as being mounted in corners of the oven construction and facing in a direction generally parallel to a side wall in order to cause such circulation of heat. It will be understand that while fans are indicated as flowing in a direction parallel to the side walls, the fans 120 may be mounted for a certain amount of pivotal adjustment so that the direction of the air driven by each of the fans may be varied to provide the desired circulation of hot air throughout the oven construction.

The heater units 102 may be any well known type of heating unit. A preferable type of heating unit may be an infrared heater which rapidly brings the air to a desired temperature and which may be readily controlled. In order to determine the temperature in the different zones of the oven, suitable thermometers generally indicated at 122 may be provided over each of the bank of heating units.

In operation of the conveyor means 32 and the oven 34, it is desirable that the stock pieces 26 travel through the heating zone at such a speed and under such heat conditions that stock pieces leaving the heating zone will be uniformly heated throughout their cross section to temperatures of about between 150° to 160°. Because the stock pieces have been finished on some surfaces, it is essential that stock pieces not be overheated and scorched because the increased softness of over-heated material will prevent suitable handling of the stock pieces at the discharge end of the oven and burning of their surfaces will make stock pieces unusable. Stock pieces entering zone 112 are subjected to a higher temperature than in the other zones 114 and 116 in order to more immediately raise the temperature of the stock pieces towards the ultimate desired temperature. The conveyor means, that is each of the chain means 64, travel at a uniform speed throughout the heating zone. The speed of the conveyor chain, which may be driven by a variable speed motor, may be selectively varied to provide a selected heating of pieces 26 at the temperatures provided by the several banks of heating units 102A, 102B, and 102C. Control of the temperature of the stock pieces at a selected rate of conveyor chain travel becomes dependent upon the control of the heating units at zones 112, 114 and 116. By experiment, the heat provided in zones 112, 114, and 116 may be determined for a selected speed of chain travel and maintained by preset thermostatic controls.

Since the purpose of heating the thermoplastic material is to permit certain later operations to be performed on the material without chipping or changing the character of the material, the transition of the material from the first heating zone 112, where the heat is more intense, to the lower temperature zones 114 and the progressively lower temperature zone 116, provides for a more uniform heating of the material throughout its thickness. The lower temperatures in zones 114 and 116 provide a dwell time or dwell temperature which permits the heat to better soak into the interior of the cross sectional thickness of the stock pieces in order to provide a substantially uniform temperature throughout the thickness of the material. The thermometers 122 provided on the top oven cover facilitate the monitoring of the heat produced by the heating units 102. An exemplary heating operation for a stock piece having a thickness of 1⅜ inches is given below.

Heat units 102A temperature: 160° F.
Heat units 102B temperature: 155° F.
Heat units 102B temperature: 105° F.
Rate of speed of chain: 1-2 feet/minute (dependent on mass)

It will be understood that since destruction of a stock piece may quickly happen if the temperature is increased too high, the heater, fans, and chain drive may be interconnected for safety so that failure of any of the units, that is the heater, fans, and chain drive will cause immediately turning off of the heater units 102. In the event of complete power failure, the parts in the heating zone must immediately be removed by cranking the sprocket shaft in order to avoid a meltdown condition in the oven where the stock becomes not readily handled.

Stock pieces 26, which have been discharged from the oven and are being carried on the end 36 of the conveyor, may now be processed at the profile station 40, the fastener or clip inserting station 42 and a drilling station 44. The stock material is now uniformly soft throughout its thickness and before cooling the operations at the profiling station 40 and the fastener driving station 42 are made.

Figures 13, 15:
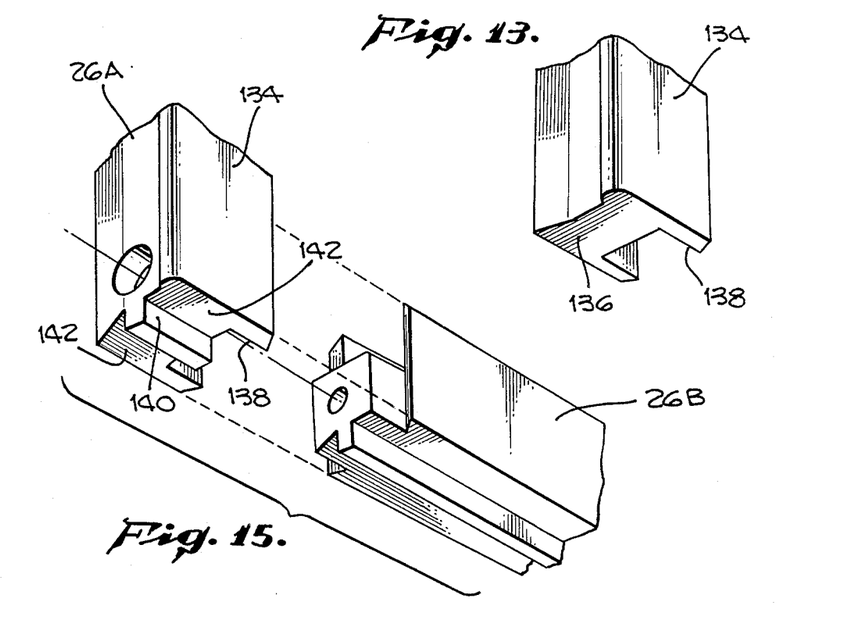
FIG. 13 is a fragmentary perspective view of an end portion of a frame member prior to profiling.
FIG. 15 is an exploded perspective view of end portions of corner joint frame members illustrating the profiled frame member in relation to the frame member to which it is to be joined.
Figure 14:
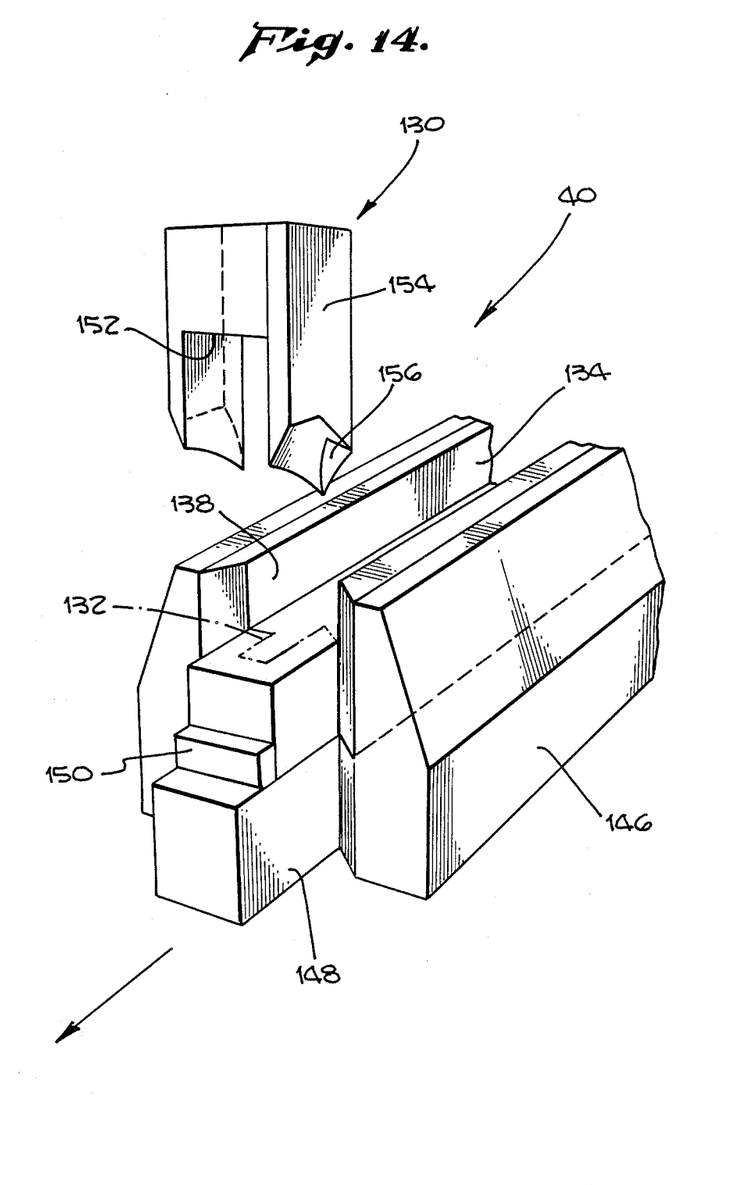
FIG. 14 is an enlarged perspective view of a profile punch and apparatus used in the method of this invention.

The profiling station is generally indicated in FIG. 14 which shows an exemplary punch die 130 for removing a portion of material which is indicated by phantom lines 132 in FIG. 14. The purpose of removal of the material may also be better understood from a consideration of FIGS. 13 and 15; FIG. 13 showing an end piece of the stock material before profiling and FIG. 15 showing the same end piece after profiling and provided with surfaces adapted to mate with a stock piece to which it is to be joined in angular relation.

As shown in FIG. 13, an end 134 of an exemplary stock piece may have a planar end face 136 disposed normal to the longitudinal axis of the end portion 134 to stock piece 26. It will be noted that the end 134 shows a piece 26 is provided with a U channel configuration indicated at 138.

In FIG. 15, the end portion 134 is illustrated after profiling and after drilling of a transverse hole therein. After profiling it will be apparent that end face 136, which lay in a plane normal to the axis of the end portion 134, has been changed to provide a polygonal section rib 140 extending from outwardly diverging surfaces 142 now forming a new shaped end face. Outwardly diverging surfaces 142 extend to end surfaces of channel section 138.

In FIG. 14, punch die 130 is shown raised over a support saddle 146 which includes a base 148 provided with a transverse upstanding stop against which a stock piece 26 being profiled may abut during the profiling operation. The punch 130 includes a recess 152 which forms two spaced punch or die portions 154, each of which terminates in a three dimensionally contoured cutting end 156 which, upon driving downwardly through the heated soft stock piece 26, will profile or configure the end face of the end portion 134 to that shown in FIG. 15 at 140 and 142. The heating of the material to a uniform temperature permits the punch or die portions 154 to smoothly enter and slice material from the end 134 of the stock piece without chipping or without creating a marred or scored end surface. The profile operation is a rapid punch die operation which is accomplished in a fraction of a second after the material is positioned in the support saddle 146.

Figures 9, 9A, 10:
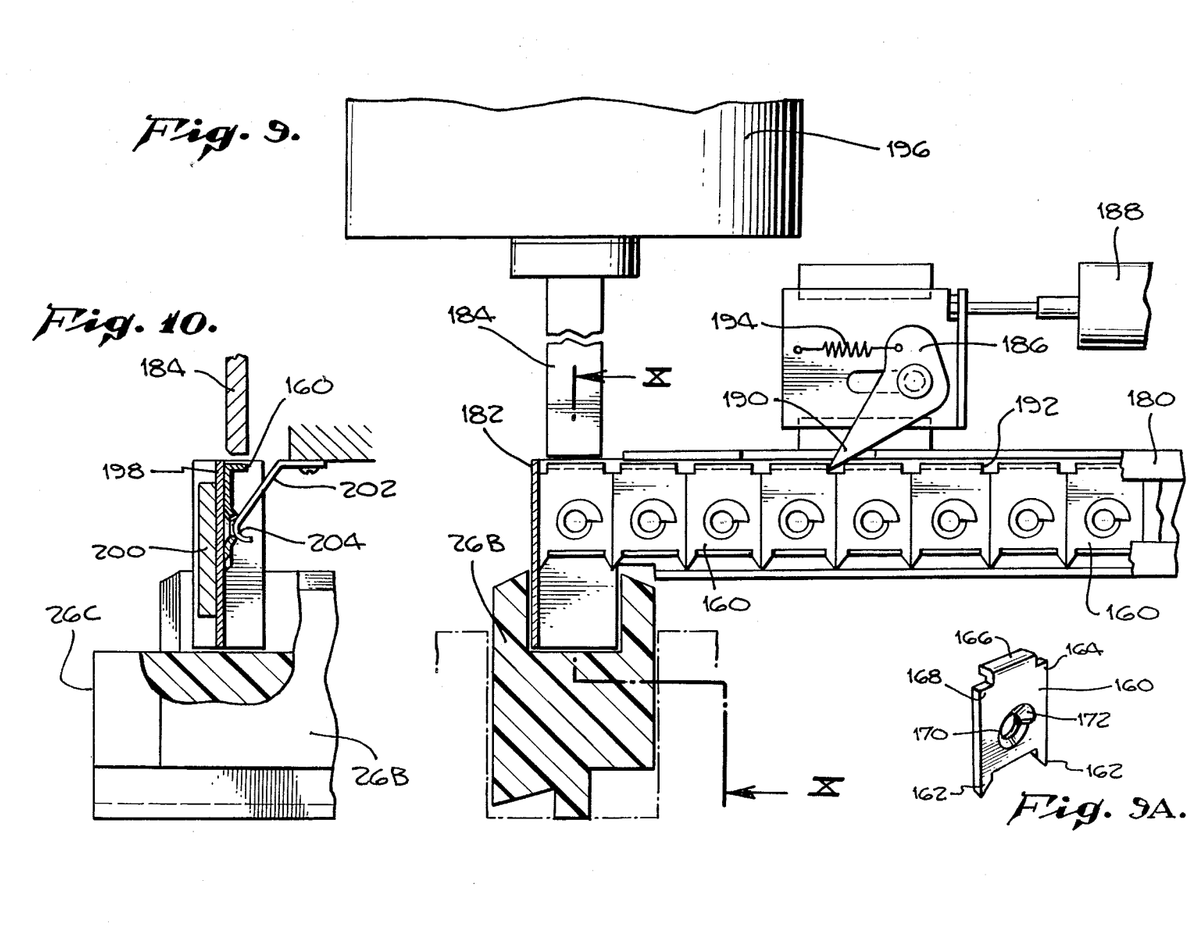
FIG. 9 is a fragmentary elevational view partly in section of a machine for advancing and driving fastener plates used in this invention.
FIG. 9A is a perspective view of a fastener plate embodying this invention.
FIG. 10 is a fragmentary enlarged sectional view taken in the plane indicated by line X—X of FIG. 9.
Figures 11, 12:
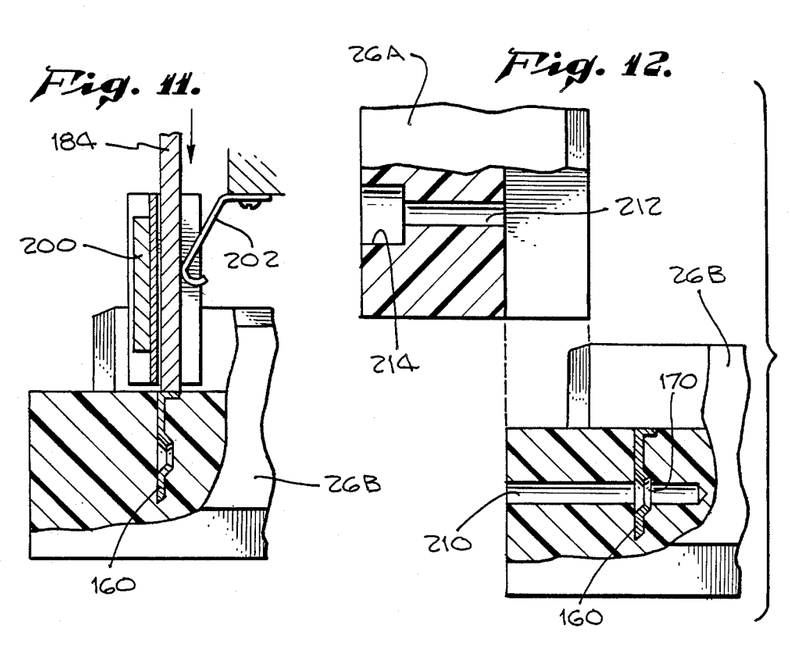
FIG. 11 is a fragmentary sectional view taken in the plane similar to that of FIG. 10.
FIG. 12 is an enlarged fragmentary exploded view of the mating of two corner joint end portions in preparation for assembly of the corner joint embodying this invention.

The stock piece 26A having end portion 134 is adapted to be mated and joined with a similarly cross sectional configured stock piece 26B (FIG. 15). In order to join the two stock pieces 26A and 26B in angular relation as indicated in FIG. 15, it is now preferred to drive a clip or fastener plate into the end portion of 26B, reference being made to FIGS. 9–12. In FIG. 9, a fastener plate 160 embodying this invention is shown as part of an interconnected strip of such fastener plates for automatic feeding of the strip to a stamping or driving machine to insert fastener plate 160 into the body of stock piece 26B. Fastener plate 160, FIG. 9A, may be rectangular in configuration and may be of a selected narrow thickness. The bottom end of plate 160 includes side edge extensions forming spear points 162 to facilitate penetration of the fastener plate in the heated stock material. The opposite end of plate 160 includes a flange 164 which extends in one direction from the plane of the plate 160. Flange 164 provides on its outer face 166 a striking surface for a driving ram 184 to forcibly insert the plate into the stock material. The undersurface 168 of the flange provides a stop surface for limiting the embedment of the plate in the stock material to a position just below or just flush with the material surface as shown in FIG. 12. Centrally of plate 160 is provided a hole 170 of selected diameter provided with a partially helical flange 172 to form a thread-like part similar to a Tinnermann type fastener. The selected diameter of the hole 170 is to threadedly receive a lag bolt as later described.

As shown in FIG. 9, fastener plates 160 may be provided in a machine belt form and in interconnected strips for feeding through a feed channel 180 to a drive position at 182 where a driving ram 184 may be actuated to drive fastener plate 160 immediately therebeneath into the stock material 26B. The machine guide 180 permits advancement incremently of plates 160 to the drive station 182 by means of an advancing cam 186 which may be actuated by a fluid operated cylinder 188. The cam 186 has an end 190 adapted to engage the opening 192 between adjacent plates 160 for incremently advancing the plates 160 at a selected rate and at a displacement the width of a plate 160. The cam 186 may be biased by a spring 194 and may include any suitable machine type advancing structure as is well known in the art.

The driving ram 184 may be connected to a press machine 196 of known form and is located with its ram 184 directly above the drive station into which the plates 160 are fed one at a time and at a selected timed interval.

As shown in FIG. 10, the ram 184 is positioned slightly above the top surface 166 of flange 164 of plate 160, the plate 160 being temporarily held against a vertical surface of a guide member 198 to which is attached a magnet 200 for holding plate 160 against the surface of the guide member 198. The stamping station may also include a spring biased stabilizer element 202 having a curved end 204 adapted to partially engage the opening 170 in the plate to further stabilize the plate against the guide surface 198. In FIG. 10, the plate 160 is positioned over a member 26B adjacent its end portion and in selected spaced relation to the end 26C thereof in order to properly locate the fastener plate 160 in the member 26B.

As shown in FIG. 11, a ram 184 has been actuated to drive the plate 160 into the soft material of the end portion of the stock member 26B to a position where the top surface 166 of flange 164 is flush with the surface of the channel provided in member 26B. In such driving position, it will be apparent that the magnetic forces of magnet 200 will readily permit the plate 160 to be driven downwardly and the biasing spring 202 will be readily retracted because of the angular position of the spring member 202 relative to the ram 184.

As shown in FIG. 12, with the anchor plate 160 driven into its selected position in the member 26B, the end portion 26B may be passed to a drilling station 44 where a hole 210 may be drilled by means of suitable jigs into the end face of member 26B and in coaxial alignment with the hole 170 of the fastener plate 160. The diameter of hole 110 is less than the diameter of hole 170 in the fastener plate.

Also at the drilling station, the profiled end portion of stock member 26A may be provided with a hole 212 which, when the pieces are assembled in angular relation, will be coaxially aligned with the hole 210. The diameter of hole 212 is similar to that of hole 210 and less than the diameter of plate hole 170. Preferably the hole 212 may have a counter sunk portion 214 to receive the head of a lag bolt 216 to be used to connect the two end portions.

Figure 16:
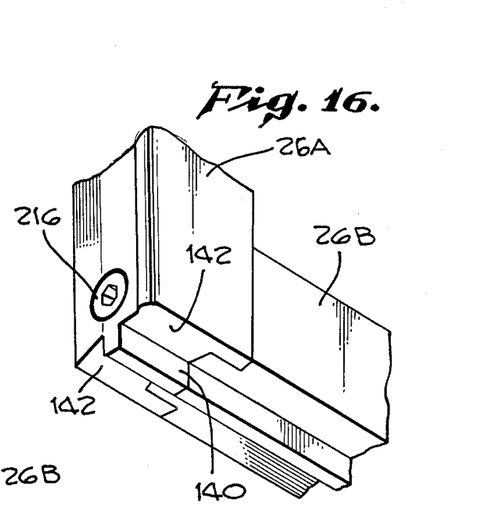
FIG. 16 is a perspective view of the assembled and secured corner joint assembly.
Figure 17:
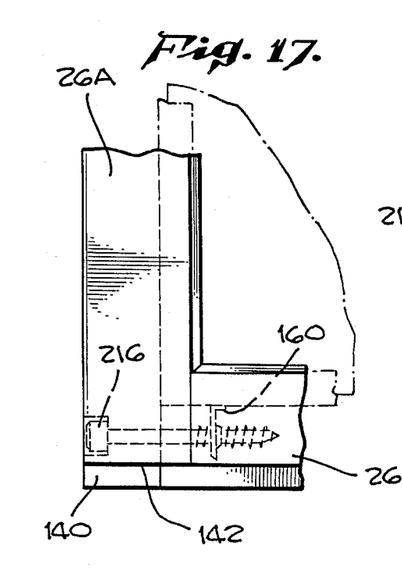
FIG. 17 is a side elevational view of an assembled corner joint showing in phantom lines the arrangement of the glass pane.

With reference to FIGS. 16 and 17, FIG. 16 shows the stock pieces 26A and 26B in final assembled position with lag bolt 216. Lag bolt 216 is driven through the hole 212 and through hole 210 and threaded into the anchor plate 160 as indicated in FIG. 17. With the corner portions of stock members 26A and 26B profiled as indicated above to provide closely mating surfaces and with fastener plate 160 embedded in the material of 26B, the corner joint provided thereby is stable and unyielding with respect to stresses imposed on such a fenestration frame structure. The fastener plate 160 in its position, as shown in FIG. 17, resists rotation which might be caused by threading of the lag bolt therein because of the flange 164 and also because of the spear points 162. The threads of the lag bolt 216 have purchase in the material of end portions 26A and 26B in addition to the nondestructible purchase of the threads in the fastener plate 160.

As noted from the above description of the method and apparatuses of this invention, that the end product mainly a stable non-yielding corner joint for two angularly disposed fenestration frame members is achieved by a combination of method production steps. One of the important steps is the heating of the thermoplastic material to a uniform state so that profiling of an end portion of a stock piece and driving a fastener clip into an end portion may be rapidly and accurately accomplished. The arrangement of the conveyor means and the oven provides for facile treatment of stock pieces to obtain the desired uniform temperature throughout the thickness of the stock pieces. This step of heating the material of the stock piece avoids prior problems which were created because of the brittleness of the extruded plastic material when profile treatment of the material was required such as in various joint configurations. The availability of the heated softened material of the stock pieces made possible the rapid driving of fastener elements into the heated material without changing the configuration of the stock piece and to make available an anchor plate which later contributed to an assembly of angularly related stock pieces in fixed unyielding relation under normal structural loads.

It will be understood that various changes and modifications may be made in the apparatuses and methods described above which may still come within the spirit of this invention and all such changes and modifications coming within the scope of the appended claims are embraced thereby.

It is claimed:

1. In a method of preparing a thermoplastic material for use in fenestration including the steps of:
    cutting elongated extruded stock of thermoplastic material to approximate length;
    placing cut stock pieces on a conveyor so that the longitudinal axes of the cut stock pieces are transverse to the direction of travel of the conveyor;
    providing an oven through which the conveyor transports said stock pieces;

heating the stock to a selected temperature uniformly throughout its cross-sectional thickness to provide softness to the thermoplastic material;

drilling a hole at a selected location in said stock;

and driving a fastener member having a hole into said stock in selected relation to said stock hole by forcing said fastener member into said softened thermoplastic material to a pre-selected depth so that the fastener hole is coaxial with said stock hole.

2. In a method as claimed in claim 1 wherein the step of heating said stock material includes the step of providing a selected dwell time for said material during its passage through said oven.

3. In a method as claimed in claim 1 wherein the step of:

placing said cut stock on the conveyor includes placing the cut stock in transverse diagonal relation to the direction of travel of the conveyor.

4. In a method as claimed in claim 1 including the step of:

spacing said stock pieces on the conveyor in the direction of travel of the conveyor.

5. A method of producing thermoplastic frames for fenestration including the steps of:

extruding frame members of thermoplastic material with selected cross-sectional shapes;

cutting said members to selected lengths;

heating the cut members to a selected temperature uniformly throughout the cross-section of the cut member to soften said thermoplastic material, and while softened:

profiling selected portions of said cut members;

drilling holes in portions of said cut members in selected locations adapted for coaxial alignment in assembly of said cut members; and driving a fastening means with a hole therein into one of said cut members so that the hole in the fastening means is coaxial with one of the drilled holes in the cut member;

placing said cut members in selected assembled relation so that the holes in the cut members are aligned; and inserting and threading a securement member into the aligned holes of said cut members and the coaxial hole of the fastening means to retain said frame members in assembled relation.

6. A method as stated in claim 5 including the step of:

transporting cut members through a heating zone in diagonal relation to the path of travel of said members.

7. A method as claimed in claim 5 wherein the step of heating includes the step of:

uniformly heating the cut members to a temperature of about, 150°–160° F..

8. A method as stated in claim 1 wherein the step of drilling includes the step of drilling a hole longitudinally of a member through the end face thereof;

and the step of driving a fastening means includes the steps of positioning a fastening member transversely of the aforementioned drill hole;

pressing said fastening member into said heated soft material of said cut member to lie in a plane transverse to the axis of said hole.

* * * * *